United States Patent [19]

Rydell et al.

[11] Patent Number: 5,718,827
[45] Date of Patent: Feb. 17, 1998

[54] PAPER FILTER FOR REMOVING METAL CATIONS

[75] Inventors: Theodore B. Rydell, Schawano; Joseph D. Wahlquist, Green Bay; Gerald W. Tumanic, Shawano, all of Wis.

[73] Assignee: Little Rapids Corporation, Green Bay, Wis.

[21] Appl. No.: 412,724

[22] Filed: Mar. 29, 1995

Related U.S. Application Data

[60] Division of Ser. No. 226,257, Apr. 11, 1994, Pat. No. 5,554,288, which is a continuation-in-part of Ser. No. 173,986, Dec. 28, 1993, abandoned.

[51] Int. Cl.⁶ .......................... B01D 27/06; B01D 39/18
[52] U.S. Cl. ................ 210/505; 210/387; 210/500.29; 210/502.1; 210/503; 210/508; 210/912; 55/487
[58] Field of Search .................... 210/503, 504, 210/505, 508, 387, 912, 500.29, 502.1, 496, 665; 55/486, 487; 426/78, 132, 432, 433

[56] References Cited

U.S. PATENT DOCUMENTS

| | | | |
|---|---|---|---|
| 3,246,767 | 4/1966 | Pall et al. | 210/505 |
| 3,327,859 | 6/1967 | Pall . | |
| 3,561,602 | 2/1971 | Molitor et al. . | |
| 3,862,901 | 1/1975 | Wennerblom et al. | 210/665 |
| 3,965,008 | 6/1976 | Dawson . | |
| 4,007,113 | 2/1977 | Ostreicher | 210/504 |
| 4,039,444 | 8/1977 | Bory et al. . | |
| 4,054,515 | 10/1977 | Sawyer, Jr. . | |
| 4,075,107 | 2/1978 | Smith . | |
| 4,094,234 | 6/1978 | Olney et al. . | |
| 4,094,779 | 6/1978 | Behrman . | |
| 4,098,177 | 7/1978 | Olney et al. . | |
| 4,119,543 | 10/1978 | Lawson et al. | 210/496 |
| 4,133,754 | 1/1979 | Bory et al. . | |
| 4,287,057 | 9/1981 | Stanley . | |
| 4,455,237 | 6/1984 | Kinsley | 210/505 |
| 4,505,823 | 3/1985 | Klein . | |
| 4,564,452 | 1/1986 | Sharpe . | |
| 4,594,158 | 6/1986 | Chong et al. . | |
| 4,696,744 | 9/1987 | Sedlacek | 210/387 |
| 4,707,263 | 11/1987 | Nishimori et al. . | |
| 4,741,828 | 5/1988 | Alhauser et al. . | |
| 4,747,955 | 5/1988 | Kunin . | |
| 4,749,481 | 6/1988 | Wheatley . | |
| 4,759,844 | 7/1988 | Lipschultz et al. . | |
| 4,787,973 | 11/1988 | Ando et al. . | |
| 4,800,018 | 1/1989 | Moser . | |
| 4,816,149 | 3/1989 | Wekell . | |
| 4,859,340 | 8/1989 | Hou et al. | 210/502.1 |
| 4,863,601 | 9/1989 | Wittekind et al. . | |
| 4,882,055 | 11/1989 | Stamstad . | |
| 4,975,292 | 12/1990 | Loizzi | 426/132 |
| 4,986,913 | 1/1991 | Schafft . | |
| 4,988,440 | 1/1991 | Bernard et al. | 210/504 |
| 5,032,224 | 7/1991 | Ahluwalia | 162/75 |
| 5,064,534 | 11/1991 | Busch et al. . | |
| 5,096,721 | 3/1992 | Levy . | |
| 5,186,830 | 2/1993 | Rait . | |
| 5,192,571 | 3/1993 | Levy | 426/433 |
| 5,486,468 | 1/1996 | Casmir-Schenekel et al. | 435/200 |

FOREIGN PATENT DOCUMENTS

| | | |
|---|---|---|
| 402661 | 12/1990 | European Pat. Off. . |
| 870975 | 6/1961 | United Kingdom . |
| 2145011 | 3/1985 | United Kingdom . |

OTHER PUBLICATIONS

H. van Dorst, "Domestic Drinking Water—An Alternative To The Tap?", Environmental Health, Feb., 1990, pp. 28–30.
Anon, et al., "Lydall—Manufacturer of Advanced Filtration Media", Filtration and Separation, Jul./Aug., 1992, pp. 290–293.
Custom Papers Group (Author and date not known).
Brita Water Filter Systems, Drop For Drop Brita Makes It Better Brita (USA), Inc. (Date not known).
Ametek Water Filtration Products by Ametek, Inc., Oct. 1992.

*Primary Examiner*—David A. Reifsnyder
*Attorney, Agent, or Firm*—Niro, Scavone, Haller & Niro

[57] ABSTRACT

Disposable paper filters suitable for removal of contaminants from fluids such as water or air are disclosed. Specific embodiments include single-ply and multi-ply filters in which metal removal additives and/or halogen and organic contaminant removal additives have been distributed during the manufacturing process. Special manufacturing methods for producing such composite filters are also described.

4 Claims, 4 Drawing Sheets

Fig. 1

TABLE 1
Test Results for Examples 1-3

| Example | Furnish Formulation, % | | | | | | Basis Wt lb/3000 ft² | CSF ml. | Average Flow Rate Min/900 ml | Buchner Funnel Water Filtration Data | | | | | | |
|---|---|---|---|---|---|---|---|---|---|---|---|---|---|---|---|---|
| | Pulp | | SMA Clay | Carbon | Wet Str | Ret. Aid | | | | % Removal Lead Liter | | | % Removal Chlorine Liter | | | |
| | Softwood | Hardwood | | | | | | | | 1 | 4 | 8 | 12 | 1 | 4 | 8 | 12 |
| Control | 49.6 Blea. | 49.6 Blea. | 0 | 0 | 0.40 | 0.40 | 120 | 610 | 2 | N/A | N/A | N/A | N/A | 71 | 22 | N/A | N/A |
| 1 | 39.6 Unbl. | 39.6 Unbl. | 20 | 0 | 0.40 | 0.40 | 120 | 610 | 2 | 99 | 93 | N/A | N/A | 98 | 98 | N/A | N/A |
| 2 | 34.6 Blea. | 34.6 Blea. | 20 | 10 | 0.40 | 0.40 | 120 | 610 | 2 | 97 | 95 | N/A | N/A | 98 | 98 | N/A | N/A |
| 3 | 39.6 Unbl. | 39.6 Unbl. | 20 | 0 | 0.40 | 0.40 | 120 | 550 | 4 | 98 | 92 | 89 | 79 | 97 | 97 | 97 | 97 |

Fig. 2

TABLE 2

| Formu-lation | Furnish Composition, wt. % | | | | | | Single Sheet Physical Test Properties | | | | | Buchner Funnel Water Filtration Data | | | | | |
|---|---|---|---|---|---|---|---|---|---|---|---|---|---|---|---|---|---|
| | Pulp | | LWM Clay | Carbon | Wet Str. | Ret. Aid | Basis Wt. | Gurley Por. | Dry Tensile | Wet Tensile | Caliper | Total Plies Tested | Total Basis Weight | Average Flow Rate | Liter 1,5,9 % removal Lead | Liter 1,5,9 % removal Chlorine |
| | Softwood | Hardwood | | | | | lb/3000 sq. ft. | Sec/100cc | lbs/in. MD/CD | lbs/in. MD | Mls/7psi | | lb/3000 sq. ft. | Min/900ml | | |
| A | Unbl 99.47 | 0 | 0 | 0 | 0.5 | 0.03 | 104 | 1.8 | 59.0/20.5 | 19.3 | 14.1 | 1 | 104 | 3.2 | 96 86 70 | 99 70 54 |
| B | Unbl 66.25 | 0 | 0 | 0 | 0.5 | 0.03 | 118 | 1.1 | 25.3/17.3 | 17.3 | 17.7 | 1 | 118 | 2.5 | 90 66 48 | 98 60 41 |
| | α-cell 33.22 | | | | | | | | | | | | | | | |
| C | Unbl 66.25 | 0 | 0 | 0 | 0.5 | 0.03 | 108 | 0.9 | 31.9/14.5 | 14.1 | 17 | 1 | 108 | 1.6 | 80 62 52 | 90 46 35 |
| | α-cell 33.22 | | | | | | | | | | | | | | | |
| D | Blea 97.79 | 0 | 0 | 0 | 0.2 | 0.01 | 35 | 0.2 | 9.3/5.8 | 3 | 7 | 3 | 105 | 1.1 | 62 52 42 | 88 23 14 |
| E | Unbl 97.79 | 0 | 0 | 0 | 0.2 | 0.01 | 32 | 0.4 | 14.0/8.0 | 4 | 6 | 3 | 96 | 2.2 | 92 76 66 | 91 33 21 |
| F | Unbl 76.45 | 0 | 18 | 5 | 0.5 | 0.05 | 89 | 2.1 | 12.5/3.8 | 1.9 | 11.4 | 1 | 89 | 2.8 | 88 84 78 | 93 43 33 |
| G | Unbl 99.9 | 0 | 0 | 0 | 0 | 0.1 | 57 | 0.3 | 14.4/7.6 | 0.5 | 11.4 | 3 | 171 | 1.5 | 99 97 93 | 100 48 31 |
| H | Unbl 92.3 | 0 | 2 | 5 | 0.5 | 0.1 | 57 | 0.4 | 13.5/7.7 | 1 | 10.3 | 3 | 171 | 1.5 | 99 99 96 | 99 86 74 |
| I | Unbl 76.4 | 0 | 6 | 17 | 0.5 | 0.1 | 57 | 0.4 | 7.9/4.8 | 1.2 | 10.4 | 3 | 171 | 1.3 | 99 98 94 | 99 97 95 |
| J | Unbl 85.93 | Unbl 9.55 | 4 | 0 | 0.25 | 0.07 | 58 | 0.4 | 11.8/7.3 | 1.5 | 8.8 | 3 | 174 | 2.7 | 99 99 97 | 98 70 59 |
| K | Unbl 81.61 | Unbl 9.07 | 4 | 5 | 0.25 | 0.07 | 58 | 0.4 | 11.7/6.8 | 1.4 | 9.6 | 3 | 174 | 2.4 | 99 99 98 | 98 92 84 |
| L | Unbl 81.61 | Unbl 9.07 | 4 | 5 | 0.25 | 0.07 | 58 | 0.4 | 11.7/6.8 | 1.4 | 9.6 | 4 | 232 | 2.9 | 99 99 99 | 98 98 94 |

Fig. 3

TABLE 3
Buchner Funnel Water Filtration Data

| Design | Formulation | | | Total Plies Tested | Total Basis Wt. lb/3000 sq. ft. | Average Flow Rate Min/900 ml | % Copper Removal | | | |
|---|---|---|---|---|---|---|---|---|---|---|
| | Pulp | Clay | Carbon | | | | Liter | | | |
| | | | | | | | 1 | 3 | 5 | 7 |
| G | 99.9 | 0 | 0 | 3 | 171 | 2.1 | 86 | 33 | | |
| J | 95.7 | 4 | 0 | 3 | 174 | 2.3 | 97 | 41 | | |
| K | 90.7 | 4 | 5 | 3 | 174 | 2.2 | 97 | 40 | 7 | |
| G | 99.9 | 0 | 0 | 5 | 285 | 2.3 | 82 | 32 | | |
| J | 96.7 | 4 | 0 | 5 | 290 | 3.7 | 100 | 67 | 30 | |
| K | 90.7 | 4 | 5 | 5 | 290 | 3.9 | 100 | 86 | 31 | |
| K | 90.7 | 4 | 5 | 8 | 464 | 6.1 | 92 | 93 | 66 | 21 |
| | | | | | | | % Iron Removal | | | |
| | | | | | | | Liter | | | |
| | | | | | | | 1 | 3 | | |
| K | 90.7 | 4 | 5 | 3 | 174 | 2.2 | 98 | 95 | | |

Fig. 4

TABLE 4

| Handsheet | Furnish Formulation, % | | | | | | | Single Sheet Physical Test Properties | Buchner Funnel Water Filtration Data | | | | | |
|---|---|---|---|---|---|---|---|---|---|---|---|---|---|---|
| | Pulp | | LWM Clay | Carbon | Wet Str. | Ret. Aid | | Basis Wt. lb/3000 sq. ft. | Total Plies Tested | Total Basis Wt. lb/3000 sq ft | Average Flow Rate Min/900 ml | Liter 1,5,9 % Removal | | |
| | Softwood | Hardwood | | | | | | | | | | | Lead | Chlorine |
| M | 0 | Blea 100 | 0 | 0 | 0 | 0 | | 102 | 1 | 102 | 4.1 | 99 82 50 | 17 7 5 |
| N | 0 | Blea 90 | 10 | 0 | 0 | 0 | | 112 | 1 | 112 | 3.7 | 95 94 76 | 24 7 5 |
| O | 0 | Blea 99 | 0 | 0 | 1 | 0 | | 102 | 1 | 102 | 5.2 | 97 88 17 | 99 29 19 |
| P | 0 | Unbl 100 | 0 | 0 | 0 | 0 | | 102 | 1 | 102 | 4.2 | 97 97 93 | 99 39 20 |
| Q | Unbl 100 | 0 | 0 | 0 | 0 | 0 | | 100 | 1 | 100 | 0.7 | 84 77 67 | 69 25 15 |
| R | Unbl 100 | 0 | 0 | 0 | 0 | 0 | | 200 | 1 | 200 | 3.0 | 98 98 97 | 99 71 52 |
| S | Blea 100 | 0 | 0 | 0 | 0 | 0 | | 175 | 1 | 175 | 1.6 | 97 68 56 | 49 13 11 |

PAPER FILTER FOR REMOVING METAL CATIONS

This is a divisional of application Ser. No. 08/226,257 filed on Apr. 11, 1994, now U.S. Pat. No. 5,554,288 which is a continuation-in-part of U.S patent application Ser. No. 08/173,986, filed Dec. 28, 1993, now abandoned entitled "Disposable Drinking Water Filter and Manufacturing Process, invented by Mr. Theodore B. Rydell.

BACKGROUND OF THE INVENTION

1. Field of the Invention

This invention relates to improved, disposable paper filters for purification of liquids and gases, particularly water and air, and to methods for manufacturing such filters. The paper filters of this invention are especially suitable for removal of such dissolved impurities as chlorine, organic contaminants and metal cations from drinking water.

2. Description of the Prior Art

In the past, most paper filter media have utilized adsorbents segregated from the paper filter medium itself, either as a separate layer or in a volume enclosed by the paper filter medium. See, for example, U.S. Pat. No. 3,327,859 (Pall), in which the paper filter medium surrounds a sorbent bed of activated carbon particles, which are used to remove chlorine and other contaminants. Other examples include U.S. Pat. No. 4,094,779 (Behrnman); U.S. Pat. No. 4,749,481 (Wheatley); and U.S. Pat. No. 4,039,444 (Bory, et al). Other patents disclose sorbent beds above or below filter sheets. See, for example, U.S. Pat. No. 4,800,018 (Moser); and U.S. Pat. No. 4,054,515 (Sawyer). Commercially available portable drinking water filters incorporating beds of carbon, such as the water pitcher style filter distributed by Brita (USA) Inc., of Oakland, Calif., utilize complex rigid plastic enclosures to contain the coarse carbon particles.

Still other patents, including U.S. Pat. No. 4,747,955 (Kunin) and U.S. Pat. No. 4,505,823 (Klein) disclose filters using admixtures of polymers such as polyesters and polyurethanes with the cellulose base. Some references suggest the incorporation of the maximum possible amounts of various granular materials into paper filters. See, for example, U.S. Pat. No. 4,859,340 (Hou, et al.); British Application No. 2,145,011 (Schroder); British Patent No. 870,975 (Fram) and European Application No. EP 0 402 661 A1 (Dirk).

These prior approaches suffer from a variety of disadvantages. The enclosure of beds of particulates such as clay or carbon inside paper pouches requires fabrication and closure of the pouches, which substantially complicates their manufacture. Only coarse particulates can be used because finer particulates cement themselves together upon contact with water and cause the bed of particulates to lose permeability, making filtration much slower or actually impossible. Moreover, beds of particulates enclosed in permeable filter sheets tend to leak small amounts of fine particles into the water or other fluid being treated, causing turbidity and discoloration.

Portable water filters using plastic filter cartridges, such as the Brita filter, share these disadvantages. In fact, leakage of fines discolors the initial batch of water treated with such devices so much that the initially-treated water must be discarded. Another disadvantage of portable water filters using plastic filter cartridges containing carbon or other adsorbents is that they do not provide any indication of when the carbon becomes saturated with tasteless contaminants such as lead. Therefore, they may continue to be used after they become ineffective. Moreover, such filters typically remain immersed in the water being treated, which may provide a hospitable medium for bacterial growth.

The disposable paper filters of our invention overcome these disadvantages. If particulate additives such as attapulgite or activated carbon are used, they are incorporated directly into the filter itself, with the assistance of novel additions and modifications to the papermaking process. Thus, very fine particulates (which have high surface areas and therefore higher adsorption rates and contaminant carrying capacities) can be used without any cementation of the particles or appreciable discoloration due to leakage into the treated fluid. Because our filters may be disposable, single-use filters, there is no need for any indication of when they become saturated with contaminants and no danger of contaminant breakthrough. And, our filters are suitable for removal of cationic contaminants such as lead, unlike certain prior art filters designed for anionic contaminants.

The paper filters of our invention are fully biodegradable and recyclable. Moreover, embodiments of our invention that do not use any wet strength agent may be flushed down toilets or discarded in plumbed-in garbage disposal units without adverse environmental effects.

Unlike such prior art filters as the Brita filter, the paper filters of our invention are not stored in a wet condition after partial use. They do not need to be activated or reactivated with water, and they do not lose any recovery efficiency if allowed to dry out after partial use.

SUMMARY OF THE INVENTION

We have discovered that paper filter media made from selected pulp types and containing a uniform, homogenous distribution of certain finely-divided adsorbents throughout the paper provide superior flow characteristics and high effectiveness in removing common contaminants such as lead cations and dissolved chlorine and organic materials from water. Our filter media may be used as flat sheets, in single or multiple plies, or formed into a variety of shapes suitable for applications such as drinking water filtration or air filtration. Multiple plies are especially satisfactory, providing superior manufacturability and fail-safe performance in terms of both contaminant removal efficiencies and flow-rates of filtrate.

We have also found that unbleached or semi-bleached pulp made from certain controlled proportions of pulp having particular fiber dimensions, surface areas and lignin levels can be processed to make filters that provide high levels of contaminant removal (including such contaminants as dissolved $H_2S$, nitrates and nitrites, which have particular affinities for lignin) without need for any additives such as activated carbon at all. Such filters are particularly appropriate if multi-ply arrangements are used or if lower contaminant saturation capacities are acceptable.

Additionally, we have found that mechanical embossing, creping or "Micrexing®," as defined below, can be used to increase the surface area of filters prepared according to our invention. The result is that the fluid being filtered experiences greater exposure to any adsorbents that may be incorporated into the filter medium, despite a reduced "footprint" for the filter.

Further, we have discovered that halogen-based or other bacteriocidal agents may be incorporated into the top (upstream) layer of a multi-ply filter. Off-flavors or odors created when such bacteriocidal agents are released during filtration are then removed in subsequent plies, producing a filtrate uncontaminated by the bacteriocidal agent.

Alternatively, such bacteriocidal agents may be added directly to the water before filtration, and their taste removed by using the filter media of our invention.

The filter media of our invention are particularly suitable for single-use applications in water filtration applications, in which the filters made from them are disposed of before there is any possibility of saturation with contaminants or growth of bacteria.

We have also invented certain modifications and improvements to conventional papermaking processes that facilitate the manufacture of such filters.

It is an object of this invention, therefore, to provide a composite filter medium comprising a paper sheet incorporating finely-divided granular particulate adsorbent additives within the pores of the filter medium itself. Such composite filter media have been found to be very effective in reducing both dissolved chlorine and lead cations to below NSF drinking water standards while maintaining adequate water flowrates during a single use. They are also suitable for other applications, including but not limited to removal of rust from used antifreeze or removal of contaminants from air, as well as for adsorbent sheets such as bath mats and shoe liners. Our filter media also can be incorporated into protective garments and gas masks to help adsorb harmful gases, vapors, bacteria and aerosols.

It is another object of this invention to provide a composite filter medium that also removes impurities such as dissolved $H_2S$, nitrates, nitrites and organic impurities including pesticides such as Lindane®, polychlorinated biphenyls, dioxins and chlorophenols.

It is still another object of this invention to provide filter media especially suitable for purification of drinking water and water used for potable beverages and for prepurification of water used in pharmaceutical and other manufacturing processes before reverse osmosis treatment.

It is a further object of this invention to provide filters suitable for removing the organic contaminants listed in NSF drinking water standard NSF 53-1992, as well as the sediments, taste and odor contaminants listed in ANSI/NSF drinking water standard 42-1988.

It is another object of this invention to provide filter media containing unbleached or semi-bleached pulp having particular fiber and lignin levels that can provide high levels of contaminant removal without the need for any particulate additives.

It is yet another object of this invention to provide a composite filter medium in which a mixed fiber paper base has been manufactured to include suitable amounts of granular activated materials such as activated carbon (for chlorine and organic material removal) and/or natural attapulgite or similar clay material (for removal of dissolved cations and/or bacteria) in a single fibrous filter.

It is a further object of this invention to provide a paper filter medium capable of achieving high levels of dissolved contaminant removal without the use of any granular particulate additives or other adsorbents.

It is another object of this invention to provide multi-ply filters that are capable of superior contaminant removal efficiencies and flowrates compared to single-ply filters of comparable total basis weight, while using less or no granular particulate adsorbent additives.

It is a further object of this invention to provide a multi-ply or layered bacteriocidal filter that avoids contamination of the filtrate with the bacteriocidal agent.

It is another object of this invention to provide multi-ply filters in which one or more plies carry a flavoring or scent constituent.

It is yet another object of this invention to provide filters of the types mentioned above in which the paper medium has been embossed, creped or softened to increase its surface area and thereby its adsorption effectiveness, while reducing its footprint.

It is a still further object of this invention to provide a novel method of manufacturing such filter media, including adsorbent additives, using conventional papermaking equipment.

BRIEF DESCRIPTION OF THE FIGURES
(TABLES)

Table 1 shows test results for Examples 1 through 3.

Table 2 shows test results for formulations A through L.

Table 3 shows test results for removal of Cu and Fe cations.

Table 4 shows test results for formulations M through S.

DETAILED DESCRIPTION OF THE PREFERRED EMBODIMENTS

The Pulp Base

We have found that disposable filter media especially suitable for purification of drinking water advantageously can be manufactured from certain binary or ternary combinations of three general pulp types: (1) softwood pulps having between about 0.5 million to about 1.0 million fibers per gram; (2) hardwood pulps having between about 5.0 million to 12.0 million fibers per gram, and (3) eucalyptus pulps having between about 15 million to 20 million fibers per gram. A suitable softwood pulp is "Alabama Pine" unbleached softwood Kraft pulp, manufactured by Alabama River Pulp Co., Inc. of Purdue Hill, Ala., which has a Kappa number of approximately 30, as measured by the T 236 cm-85 standard TAPPI test. A suitable hardwood pulp is "Burgess" unbleached hardwood Kraft pulp, manufactured by the James River Corporation of Berlin, N.H., which has a Kappa number of about 21. Eucalyptus pulp is available from a variety of sources. A suitable eucalyptus pulp is Riocell oxygen-bleached Kraft pulp.

Combinations of such pulps produce paper filter media having net electronegative characteristics, which we have found desirable in removing dissolved cations from water.

In order to achieve the desired flow characteristics of the final filter medium, we have found that the following variables can be adjusted: (1) the choice of proportions of pulp types; (2) the amount of defibrillation (i.e., mechanical refining) to which the pulp is subjected; (3) the amounts of retention aids and/or finely-divided particulate adsorbents (if any) that are added; (4) the drying rate at the wet end of the paper machine, as controlled by certain modifications to the machinery and processing conditions described below; (5) the optional use of Micrexing® to increase permeability; (6) the optional addition of fibrous bulking aids such as alpha cellulose fiber to increase permeability; (7) the number of plies used (in this specification the term "ply" refers to a single sheet of filter medium of whatever basis weight); and (8) the optional use of mechanical densification (calendaring) to decrease permeability.

We have found that controlling the filter medium's caliper reading (as measured by applying 7 psi to the sheet according to the TAPPI 411 standard test of the Technical Association for the Pulp and Paper Industry (TAPPI) is important when targeting specific filter flowrates. For gravity flow water filter applications which are not pressurized, where a "fast flow" of less than 5 minutes per liter per 20 sq. in. of filter area is targeted, a sheet density in the range of 0.3 to 0.5 grams/cc is desired. For "slow flows" of more than 5 minutes per liter per 20 sq. in. Using gravity flow, and for pressurized devices, the targeted sheet densities should range from 0.5 to greater than 0.7 grams/cc. Combinations of long coarse pulp fibers (softwood) with a given adsorbent filler material tend to produce much lower density sheets than combinations of short fine pulp fibers (hardwoods) in combination with the same given adsorbent filler material.

For most applications, we have found that one or more of the foregoing types of pulp should be combined to produce a final paper product made from a pulp feedstock controlled to have an average Kappa number of between about 10 and about 50, as measured by the T 236 cm-85 standard TAPPI test. Below a Kappa number of 10, the resulting filter medium does not have sufficient lignin to contribute effectively to the adsorption of contaminants, thus necessitating undesirably high levels of metal removal additive and/or halogen and organic carbon removal additive. Above a Kappa number of about 50, the lignin content is so high that chemicals from the pulp tend to contaminate the filtrate. The preferred Kappa number range of approximately 10 to approximately 50 can be attained by controlling the proportions of the foregoing three general pulp types, and may also be attainable using a single pulp source alone, such as Burgess unbleached hardwood pulp. We have found that using pulp having a Kappa number in the foregoing range provides sufficient lignin in the finished filter medium to provide some absorbent capability for dissolved metals, halogens and organic contaminants without the use of further additives, and also makes the addition of additives of the types described below more effective.

The pore size of the paper product is also important. We have found that higher proportions of eucalyptus or hardwood pulps generally produce finer pore sizes and greater adsorptive surface areas per gram of fiber. We have also found that higher proportions of adsorbents (as well as mixtures of adsorbents with wide particle size distributions) tend to reduce the pore size of the final filter medium. A suitable pore size distribution of between about 0.5 microns and about 50 microns is produced by varying the amounts of fine and coarse fibers depending upon the amount and particle size of adsorbent considered suitable for the finished product.

For "fast flow" filters, we have found that pulp mixtures producing a Canadian Standard Freeness (CSF) of at least about 400 ml., and more preferably above 600 ml., in the final filter medium should be used. These levels can be attained at varying basis weights by adjustment of the number of plies, if desired. Multiple ply filters may be embossed together, at least at the edges of the filter sheet. Such filters require higher strength than single ply filters for satisfactory embossing. Higher strength is attainable by increased mechanical refining. The amount of refining, however, is limited by the tendency to reduce the permeability of the final product.

We have found that Kraft pulps are generally preferred to sulfite pulps for water filtration applications. That is partly because Kraft pulps are stronger than sulfite pulps. We have also discovered, however, that sulfite pulps and even chemithermal-mechanical (CTMP) pulps can be used in novel multi-ply filter media described below.

We have also found that the performance of filters of a given composition is dependent upon their basis weight. Higher basis weight, whether attained in a single ply or through the use of multiple plies of individually low basis weight, produces superior removal levels for halogens, organic contaminants and metal cations. Advantageously, as discussed below, higher basis weights can be attained using multi-ply filters, which typically provide superior flow characteristics for a given total basis weight.

The Fibrous Bulking Aid

We have found that fibrous bulking aids, such as the alpha cellulose fiber manufactured under the trade name Buckeye HPZ by the Buckeye Cellulose Co. of Foley, Fla., can be used (if desired) to adjust the porosity of the filter medium to meet specific application requirements. Alternative fibrous bulking aids include the general category of flash-dried pulps and the more specific category of cellulose chemically modified to produce high-bulking properties. Depending on the specific alpha cellulose fibrous bulking aid used, the general trend is for it to act as a debonding agent (reducing the amount of hydrogen bonding between cellulose fibers) when added to pulp fiber slurries. This results in sheets having less density that are suitable for making faster flow filters. Fibrous bulking aids can be added, if desired, in amounts up to 50% by weight of the furnish. Above about 50% (or above 25% for alpha cellulose) the reduction in strength caused by the fibrous bulking aid becomes unacceptable.

We have discovered that filters made according to the foregoing pulp specifications meet the ANSI/NSF 42-1988 standards for sediment removal. Thus, our invention also includes paper filter media suitable for filtering water to remove sediment simultaneously with removing dissolved halogens and organic contaminants, as well as metal cations.

The Halogen and Organic Contaminant Removal Additive

Suitable granular, particulate additives for enhancing the removal of halogens (e.g., dissolved chlorine) and organic contaminants such as pesticides, include finely divided activated carbon (preferably activated wood charcoal). The preferred particle size distribution for the halogen and organic contaminant removal additive is:

| USS Screen Size | Percent Passing |
| --- | --- |
| 100 mesh | >90% |
| 325 mesh | >60% |

The halogen and organic carbon removal additive should be distributed evenly throughout the filter medium. Coarser particles are more difficult to retain in the filter sheet, and also have less surface area available for adsorption. Generally, we have found that because smaller mesh sizes of such additives have greater surface area per unit weight of granular additive, they provide improved removal efficiencies.

More specifically, Cecarbon Grade PAC-20B®, Serial D19 activated charcoal, manufactured by Atochem North America, Inc. of Philadelphia, Pa. 19102, is effective. Activated wood charcoal sold by American Norit of Atlanta, Ga. 30338, under the trade name DARCO KB® wood-based charcoal also is satisfactory. Activated charcoal also sold by American Norit under the trade name Norit CA1 wood based charcoal may be used, and is especially preferred. Alternatively, a coal-based activated carbon material such as that sold by the Calgon Corporation of Pittsburgh, Pa. 15230 as "Calgon WPL Pulv®" may be used. Activated carbon is also an effective adsorbent for removal of organic contaminants, and it also facilitates removal of some metal cations, including lead. As used in our specification, the term "halogen and organic contaminant removal additive" encompasses all of these materials together with their functional equivalents, for use with any halogen or organic contaminant.

In comparison with metals removal, we have found that halogen removal is more sensitive to flowrate. Thus, where halogen removal is of primary interest, the filter should be designed for lower flowrates than where only metal removal is desired.

Satisfactory results for halogen removal have been obtained at 1% to 20% by weight of halogen and organic contaminant removal additive in the finished filter medium where such an additive adsorbent is used at all. Above 20% this additive becomes difficult to retain in the filter sheet and can result in particulates being released into the filtrate.

The Metal Removal Additive

We have found that NSF drinking water standard NSF 53-1992 for lead can be met using the filter media incorporating the following general classes of additives: (1) alumino-silica zeolites available in various salt forms such as the potassium salt zeolite Valfor G102®, manufactured by Valfor Corporation of Valley Forge, Pa.; or more preferably (2) naturally occurring clays having the general chemical formula $(Mg,Al)_5Si_8O_{22}(OH)_4 \cdot 4H_2O$. Related clays which provide suitable performance for removal of lead and other cations include attapulgite, palygorskite, montmorillonite, dioctahedral smectite and Fuller's earth. A commercially-available clay with especially suitable properties for metals removal (especially lead) is available from the Oil-Dri Corporation of Vernon Hills, Ill. 60061, under the trade name Oil Dri Renew LVM. Other suitable metal removal additives include Oil Dri Renew RVM; Oil Dri Renew SMA; and Florex® Min U Gel®, manufactured and sold by the Floridon Company of Berkeley Springs, W. Va. 25411. The preferred particle size distribution for the metal removal additive is:

| USS Screen Size | Percent Passing |
| --- | --- |
| 100 mesh | >90% |
| 325 mesh | >60% |

As used in our specification, the term "metal removal additive" encompasses all of these materials together with their functional equivalents, for use with any metal contaminant.

About 1% to 20% by weight of metal removal additive is preferred in the finished composite filter medium. Above 20% this additive becomes difficult to retain in the filter sheet and also tends to reduce the porosity of the sheet to unacceptably low levels. A loading of about 2% to 10% by weight is most preferred for drinking water filtration applications. The metal removal additive should be distributed as evenly as possible throughout the filter medium.

The Wet Strength Agent

It may be desirable to include a wet strength agent such as a neutral pH curing polyamide in an amount of up to about 2% by weight of the finished filter medium. Above about 2%, wet strength agents have no further beneficial effect. Concentrations of about 0.25% to about 0.5% by weight are especially preferred for drinking water purification applications. One suitable wet strength agent of that type is sold under the trade name Kymene 557H®, manufactured by the Hercules Corporation of Wilmington, Del. 19894. its chemical formula is diethylene triamine adipic acid polyamine epi, in aqueous solution. Other suitable wet strength agents include AMRES 8855®, manufactured by the Georgia Pacific Corporation of Atlanta, Ga., having a similar chemical formula. As used in our specification, the term "wet strength agent" encompasses all of these materials together with their functional equivalents.

It is possible, however, to provide adequate wet strength without using any wet strength agents, depending upon the specific fibers used, and level of refining applied to the fibers. We have found that the filters of our invention are flushable, providing that no wet strength agent is used.

Surprisingly, we have found that wet strength agents promote halogen removal, in addition to improving the wet strength of the filter medium.

The Retention Aid System

If it is desired to add any granular particulate additives to the finished filter medium, retention aids may be used to enhance retention of the granular particulate additives in the pores of the finished filter medium. Such retention aids are preferably combinations of a high molecular weight anionic polymer and a low molecular weight, strongly charged cationic polymer. The preferred amounts of the constituents of a dual polymer retention aid are as follows, expressed as weight percent of the finished filter medium:

|  | Maximum | Preferred |
| --- | --- | --- |
| High molecular weight anionic polymer | 0.25% | 0.05%–0.15% |
| Low molecular weight cationic polymer | 0.25% | Less than 0.15% |

Above the maximum levels shown above for the retention aid system components, we have found that the viscosity of the stock solution becomes so high that the papermaking operation becomes difficult or impractical.

A suitable dual polymer retention aid system is Nalco 7533® anionic polymer combined with Nalco 7607® cationic polymer, both made by Nalco Corp. of Naperville, Ill. Nalco 7607® is a poly quaternary amine chloride in aqueous solution; Nalco 7533® is acrylamide-acrylate copolymer emulsified in water and a solvent.

Where a wet strength agent is also used, we have discovered that it can also perform the function of the low molecular weight cationic polymer in the retention aid system, so that only a high molecular weight anionic polymer of the type described above need be employed to provide an effective retention aid system.

As used in our specification, the term "dual polymer retention aid system" encompasses all of the foregoing materials together with their functional equivalents.

Making the Composite Filter Media

We have found that a conventional papermaking machine can be adapted for manufacturing the composite filter media of our invention. The first step is blending the chosen pulps in the pulper. Then, the wet strength agent (if desired) is added batchwise to the pulper. Wet strength agent also may be added continuously to the stuff box. If a retention aid is used, it may be added batchwise to the pulper (preferably in pulpable bags) or continuously to the water recycle in the headbox or to the dilute stock at that point. If an anionic retention aid is used, with the wet strength agent serving the purpose of the cationic portion of the retention aid system, the anionic retention aid preferably should be added to the feedstock line leading to the headbox. If a retention aid is added continuously, it preferably should be diluted to about 1 wt % in water before addition.

If an halogen and organic contaminant removal additive is used (and especially if activated carbon is added for that purpose), we have found that it is most effective to add the halogen and organic contaminant removal additive to the dilute stock after any wet strength agents have been added. Otherwise, the halogen and organic contaminant removal additive may react with or adsorb the wet strength agent before it has an opportunity to react with the cellulose in the pulp. If activated carbon is used as an halogen and organic contaminant removal additive, adding it after reaction of the wet strength agent with the pulp has been found to increase the effectiveness of the wet strength agent up to 100% compared to earlier or simultaneous addition of the activated carbon.

The halogen and organic contaminant removal additive preferably should he added continuously to the dilute stock feed to the headbox, in the form of a water slurry of 10 wt % or less of halogen and organic contaminant removal additive. Slurry concentrations up to 20% by weight may be used, but such high concentrations may present pumping problems. Addition of the halogen and organic contaminant removal additive to the dilute stock feed to the headbox in the form of a water slurry effectively eliminates dusting problems that arise when handling additives such as finely-divided activated carbon in powder form, and also promotes homogeneous distribution of the additive in the finished filter medium. It also enables use of pulping times in the ordinary range of about 20 minutes, in contrast to longer times required if the halogen and organic contaminant removal additive is added batchwise to the pulper.

We have also found that certain modifications to the wet end of the papermaking machine are desirable to achieve satisfactory performance in the drying step. Specifically, if granular particulate additives such as metal removal additives and/or halogen and organic contaminant removal additives are used, it is desirable to reduce the water removal rates at the wet end of the table. If ordinary processing conditions and water removal rates are used, much of the granular particulate additives may not be retained in the paper. To prevent that, we reduced the number of foil blades to less than half the ordinary complement of approximately twenty, and replaced the remaining foil blades to provide an angle between them and the paper of about 2° instead of the ordinary 5°.

In addition, we discovered that the felts preferably should be run at the highest possible speed in the later part of the drying operation in order to maintain the permeability of the finished filter at an acceptably high level. Drying time preferably should be about 0.5 to 1.0 minutes, depending on the weight of the paper and the drying capacity of the machine. The maximum sheet temperature preferably should be about 212° F. We have found that the moisture level in the finished filter medium preferably should not be allowed to exceed about 5% by weight.

For filter media incorporating granular particulate additives (either metal removal additives or halogen and organic contaminant removal additives), we have found that incorporation of more than about 17% activated carbon into a filter medium may require use of special dust control equipment for the winder, especially if adhesive binders are not used. We prefer that adhesive binders not be used to reduce dusting and retain the granular additives, because binders tend to interfere with adsorption of contaminants and may actually leach into the filtrate. In particular, we prefer to avoid use of adhesive binders, latex rubber binders, or polymer binders.

In filter media incorporating halogen and organic chemical removal additives, we have also discovered that finished rolls of filter media must be promptly and tightly packaged in packing material that is as nearly hermetically sealed as possible. This is particularly important where the additive includes activated carbon. Unless such filters are tightly sealed, the halogen and organic contaminant removal additives can adsorb moisture and organic vapors from the air, reducing their capacity for actual use.

Embossing, Wet Creping and Micrexing®

We have also found that mechanical embossing, wet creping or "Micrexing®" may be used advantageously to increase the surface area of filter media for a given filter size or "footprint." For example, such treatment provides increased surface area for a given filter sheet footprint, thus exposing the water or other fluid being treated to more of the fibers as well as any incorporated additives such as those described above. ("Micrexing®" is a dry creping process offered under that service mark by the Micrex Corporation of Walton, Mass.)

Mechanical embossing is also useful in bonding the edges of multi-ply filter sheets together. Several such specific multi-ply embodiments are described in the Examples below.

Without limiting in any way the range of filter media that can be manufactured according to our invention, the following examples illustrate specific embodiments of our filter media.

EXAMPLES

EXAMPLE 1

Single Ply Filter With Metal Removal Additive

An eight inch diameter, 120 lbs. per 3,000 square foot ream laboratory handsheet filter was prepared using a Valley Sheet Mold. The base pulp fibers used (50% unbleached Mackenzie Northern Kraft softwood and 50% unbleached Burgess Northern Kraft hardwood) were refined using a Voith laboratory beater to a CSF of 610 ml. A 1% stock solution containing 4.8 bone dry grams of refined pulp was placed in a laboratory Waring blender and blended with 2.4 ml. of a 0.1% solution of AMRES 8855 neutral cure wet strength agent for one minute, after which 1.2 grams of Oil Dri Renew SMA attapulgite clay was added and mixed for an additional one minute, to provide a finished filter sheet having 20 wt % metal removal additive. A dual polymer retention aid system was added during the handsheet formation; the dual polymers were 0.15 wt. % Nalco 7533 and 0.25 wt. % Nalco 7607 based on bone dry finished product. Handsheets were formed on a 100 mesh stainless screen, then couched off the screen with blotters, dried 10 minutes on steam heated lab dryer cans, and oven cured 5 minutes at 105° C., to set the wet strength resin.

The resulting 8 inch diameter filter was used to filter a contaminated water sample that had been analyzed to contain 2.0 ppm chlorine and 150 ppb lead to simulate a contaminated city water supply. The filter was clamped in a Buchner funnel. Single passes of one liter each of the contaminated water sample were filtered by gravity flow. The free flowrate was 125 seconds per liter for the first liter and 95 seconds by the time the fourth liter was passed through. The filtrate was analyzed for residual chlorine and lead using a Hach 2000 spectrophotometer and procedures complying with EPA drinking water analysis standards. The procedure described in the NSF 53-1992 standard for "Drinking Water Treatment Units—Health Effects" was used for lead analysis. The procedure described in the ANSI/NSF 42-1988 standard for "Drinking Water Treatment Units—Aesthetic Effects" was used for chlorine analysis.

Results showed a 98% removal of chlorine in the first and fourth liter filtered. For lead 99% was removed in the first liter and 93% in fourth liter. Thus, NSF standards were met for four single passes of one liter each using this disposable paper filter.

As a control, a handsheet was prepared using the foregoing procedure except that the pulp was a 50/50 mixture of fully bleached Mackenzie Northern Kraft softwood and fully bleached Burgess Northern Kraft hardwood. The same amount of metal removal additive was used. Tests using the same contaminated water sample described immediately above, and the same test procedures, showed only 71% removal of chlorine in the first filtered liter and 22% removal of chlorine in the fourth liter. These results underscore the surprising discovery that unbleached pulp can achieve high levels of chlorine removal without any activated carbon, while the bleached pulps that are in more common use for filter manufacture cannot remove chlorine effectively without the addition of activated carbon.

EXAMPLE 2

Long Term Test of Single Ply Filter with Metal Removal Additive

A handsheet identical to Example 1 was prepared, except that the unbleached pulp was refined to a CSF of 550 ml. The resulting filter was tested to determine its ability to adsorb chlorine and lead from up to 12 liters of contaminated water, applied in one liter increments, using the same NSF test procedures. Chlorine removal levels of 97%, 97%, 97%, 97% were attained for the first, fourth, eighth, and twelfth liter passed through this filter medium. Lead removal levels were 98%, 92%, 89%, 79% for the first fourth, eighth, and twelfth liter passed through. The average filtration was approximately 6 minutes per liter. This test demonstrates the surprisingly extended filter life that can be attained with unbleached pulp even without using any halogen and organic contaminant removal additive such as activated carbon.

EXAMPLE 3

Single Ply Filter for Removal of Organic Contaminants

A handsheet identical to Example 1 was prepared. Contaminated water samples containing 10 ppb and 0.88 ppb of the pesticide Lindane® (gamma-benzene hexachloride) were filtered. The results were:

| Feed concentration, ppb | Filtrate concentration, ppb |
| --- | --- |
| 10.00 | 6.3 |
| 0.88 | 0.08 |

Another handsheet was prepared as in Example 1, except that an equal amount of DARCO KB activated carbon was substituted for the Oil Dri Renew SMA attapulgite clay. Tests on water samples contaminated with Lindane® produced the following results, using the NSF test procedures described in NSF 53-1988 for Lindane®:

| Feed concentration, ppb | Filtrate concentration, ppb |
| --- | --- |
| 10.00 | 0.05 |
| 0.88 | <0.03 |

Thus, NSF requirements for Lindane® removal (NSF Standard NSF 53-1992, Table 1) were met, including an influent challenge of at least 0.6 ppb with a maximum effluent concentration of 0.2 ppb allowed. In fact, the 10 ppb challenge we used was over fifteen times the NSF standard influent challenge, yet the allowable effluent concentration was not exceeded. These tests demonstrate a filter medium using activated carbon that is preferred for removing organic contaminants such as pesticides.

Formulations and test results for the filters of Examples 1 through 3 are shown in Table 1.

EXAMPLE 4

Single Ply Filter with Halogen and Organic Contaminant Removal Additive

Although fully bleached pulp is generally less satisfactory than unbleached pulp from the standpoint of removal of both metal cations and halogens and organic contaminants, it does have at least one advantage: the bleaching process reduces the possibility of residual trace organic contamination in the finished filter originating from the pulp itself. It is desirable, therefore, to be able to formulate filters using bleached pulps as a starting point. We have found that this can be advantageously accomplished by the addition of a halogen and organic contaminant removal additive such as activated carbon.

The general procedure of Example 1, modified to reflect the furnish composition shown below, was used to prepare a handsheet having the following finished composition:

| | | |
| --- | --- | --- |
| Paper base | 70% | (50% fully bleached Mackenzie Northern Kraft softwood and 50% fully bleached Burgess Northern Kraft hardwood by weight) |
| Lead adsorbent | 20% | (Oil Dri SMA attapulgite clay) |
| Chlorine adsorbent | 10% | (DARCO KB wood-based charcoal) |
| | 100 wt. % | |

Tests using the same contaminated water sample described in Example 1, above, and the same test procedures, showed the following results:

| | First liter | Fourth Liter |
| --- | --- | --- |
| Chlorine Removal | 98% | 98% |
| Lead Removal | 97% | 95% |

Thus, despite the lower lignin content of bleached pulp, the addition of 10% activated carbon and 20% clay produced satisfactory lead and chlorine removal results.

EXAMPLE 5

Single Ply Fine Pore Structure Filters

A base paper pulp mixture was prepared using 75% eucalyptus and 25% Northern pine softwood by weight. Cecarbon PAC-20B activated carbon was added in an amount of 0.00067 lbs per square foot. Filter discs 6.3 inches in diameter were prepared at three levels of basis weight (expressed below as lbs per 3000 $ft^2$ ream), thus varying the weight percentage of activated carbon in the finished filter as well as the weight of the composite filter medium:

| Basis Weight lbs/ream | Mixed Pulp lbs/ft² | Content wt % | Activated Carbon lbs/ft² | Content wt % |
| --- | --- | --- | --- | --- |
| 15 | 0.0044 | 86.8 | 0.00067 | 13.2 |
| 30 | 0.0094 | 93.3 | 0.00067 | 6.7 |
| 50 | 0.0161 | 96.0 | 0.00067 | 4.0 |

The CSF values for these filters ranged from 500 ml. to 700 ml.

One gallon of water initially containing 1.5 ppm of dissolved chlorine was filtered by gravity drainage through a filter retained in a Buchner funnel. The following results were obtained:

| Basis Weight lbs/ream | Activated Carbon wt % | Residual Chlorine ppm | Filtration Time, sec. |
| --- | --- | --- | --- |
| 15 | 13.2 | 0.8 | 45 |
| 30 | 6.7 | 0.41 | 130 |
| 50 | 4.0 | 0.0 | 380 |

The percentage removal of chlorine, therefore, was as follows:

| Basis Weight lbs/ream | Chlorine Removal Percent |
| --- | --- |
| 15 | 47 |
| 30 | 73 |
| 50 | 100 |

These results provide single ply, fine pore structure filters capable of achieving high contaminant removal levels despite their comparatively low basis weights.

EXAMPLE 6

Flavored or Scented Filters

A handsheet identical to that described in Example 1 was prepared, except that the base pulp was 50% bleached Kraft ENCE eucalyptus hardwood and 50% unbleached Kraft Mackenzie Northern pine softwood. The pulp was refined to a CSF of 620 ml. After this handsheet was prepared it was spray coated on one side with 0.3 grams of a natural raspberry flavoring (WONF 13503098), manufactured by International Flavors and Fragrances, of Union Beach, N.J. 07735. A contaminated water sample containing 2.0 ppm chlorine and 150 ppb lead was filtered through from the uncoated side and filtration efficiencies (based on the NSF test procedures cited in Example 1) of 99% for chlorine and 98% for lead were measured on the first filtered liter. A taste test showed a noticeable raspberry flavor in the purified water. This example provides drinking water filters that can impart flavoring to filtered water. Similar techniques would be suitable for the addition of scent to multi-ply filters designed for gas filtration.

It is expected that multi-ply filters with flavoring or scent in the bottom (i.e. downstream) layer would be preferred. In such instance, a pure cellulose base would be preferred for the downstream ply carrying the flavor or scent. Alternatives to spray coating, such as granular coating, roller coating, saturating and drying, and printing are known to those skilled in the art and also could be employed to add flavors or scents. Such techniques also could be used to add other chemicals, such as antibacterial chemicals, to the filter media of this invention.

EXAMPLE 7

Filters For Use With Antibacterial Agents

One embodiment of our invention is a novel bacteriocidal filter. Specifically, a filter having two or more plies may be prepared in which the top (i.e. upstream) ply may be impregnated with an antibacterial agent, preferably halogen-based. The antibacterial agent can be iodine, chlorine, or bromine based, and would be released from a salt form (preferably sodium-free) incorporated into the top sheet as the water passes through the top sheet. One such antibacterial agent, for instance, would be calcium hypochlorite. It may be desirable to microencapsulate the antibacterial agent. The bottom sheet may be a biocide removal ply made according to the disclosures above for removal of chlorine—for example, any of the formulations of Examples 1 through 5 could be used for the bottom sheet. The sheets may be bonded together by embossing around their edges or by other methods known to those skilled in the art.

In operation, bacterially-contaminated water will first pass through the top sheet, where exposure to the chlorine-based bactericide will destroy the bacteria. Without further processing, such treatment would leave a distasteful chlorine off-flavor. The bottom sheet, however, will immediately remove the chlorine introduced by the top sheet, thereby producing clean water free of both bacterial contamination and undesirable flavors of chlorine or other halogens. A plurality of top (upstream) and bottom (downstream) plies could be used, if desired. For further improvement of taste, a spray or other type of coating of flavoring may be applied to the bottom sheet, as well. See Example 6, above.

We have tested another embodiment of our invention for use in combination with antibacterial agents added directly to contaminated water. A one-quart sample of contaminated river water was analyzed to contain 81 colonies of bacteria per ml., based on an 0.1 ml. sample incubated on an agar substrate for 48 hours at 36° C. The water sample had a pH of 7.7, as well as 95 ppm of $CaCO_3$ and 60 ppm of $MgCO_3$. Sufficient $PbNO_3$ was added to bring the lead cation content up to 150 ppb. The contaminated river water sample was then treated with a commercially-available halogen tablet to destroy the bacteria.

Following bacteriocidal treatment, the water sample was filtered using a 12"×12" single-ply filter of formulation A of Table 2. The filter was manually formed into a cone shape and the one quart water sample was poured through it. Analysis of the filtrate for lead using the NSF 53-1992 test protocol. The lead concentration in the filtrate was only 3 ppb, demonstrating 98% removal of the dissolved lead. Moreover, a taste test on the filtrate demonstrated that there was no halogen flavor remaining from the halogen purification operation. Thus, disposable filters made from the filter media formulations of our invention are suitable for use in combination with commercially-available halogen water treatment chemicals to produce a bacteria-free filtered water product that is also free of the objectionable taste produced by such treatment.

EXAMPLE 8

Multi-Ply Filter Using CTMP and TMP Pulps

Chemi-Thermal-Mechanical (CTMP) and Thermal-Mechanical (TMP) pulps have some desirable properties as bases for filter media because of their high lignin contents. That property leads to high removal efficiencies for metals and halogens. CTMP and TMP pulps are comparatively cheap and simple to manufacture. CTMP pulp, for example, is basically wood chips soaked in a sodium sulfite solution and mechanically refined using steam and elevated pressure. In the past, however, CTMP and TMP pulps have been thought undesirable as a basis for liquid filters (especially for drinking water filters). In the case of CTMP pulp, sulfite in the pulp imparts an off-flavor to the filtered water. Both CTMP and TMP pulps contain appreciable amounts of undesirable organic chemicals.

A multi-ply filter made according to our invention overcomes these problems. Specifically, the top (i.e. upstream) ply or plies of this embodiment of our invention may be made of CTMP pulp or TMP pulp without additives, taking advantage of the natural ability of CTMP-based and TMP-based filters to recover halogens. The bottom (i.e. downstream) ply or plies may be made of any suitable paper having organic contaminant removal capability.

EXAMPLE 9

Filters Containing a Fibrous Bulking Aid

A series of batches of machine-made filter media was manufactured on commercial wet forming paper machine, utilizing the process modifications of our invention (described above). A variety of single and multi-ply filters were cut and fabricated from the filter media produced in these runs. The resulting filters were tested for lead and chlorine removal using a contaminated water sample with 2.0 ppm of dissolved chlorine and 150 ppb of lead. Table 2 shows these formulations and test results based on the same NSF test procedures cited in Example 1. All of the formulations shown in Table 2 used only the anionic portion of the retention aid system, since the wet strength agent acted as the cationic portion of the retention aid system. In this table, tensile strengths in the machine direction (MD) and the cross direction (CD) are expressed in lbs. per inch width. Porosity was measured using the standard Gurley porosity unit and expressed as the number of seconds for 100 cc of air to pass through a 1 inch diameter circle area of the filter. The caliper measurement is expressed in terms of thousandths of an inch at a pressure of 7 psig.

Formulations A through C of Table 2 illustrate the effect of alpha cellulose fibers on removal efficiencies and filter flowrates. The addition of about 33% alpha cellulose fibers to filter media made from unbleached Alabama River softwood pulp Kraft without any metals removal additive or halogen and organic contaminant removal additive can double the filtration speed at about the same basis weight. This is reflected in the concomitant reduction in Gurley porosity. There is some reduction in lead and chlorine removal efficiency, but proportionally less reduction than the gain in filtration rate. These results indicate that multi-ply filters containing alpha-cellulose fibers may provide improved flowrates compared to a single-ply filter of a basis weight similar to the combined basis weight of the multi-ply filter. Thus, fibrous bulking aids are useful in providing adequate flowrates for heavy weight filters and filters containing high proportions of granular particulate additives.

EXAMPLE 10

Multi-Ply Filters

We have found that multi-ply filters fabricated from machine-made filter media produced by the process of our invention provide significant advantages compared to single-ply filters of comparable basis weight. First, commercial-scale manufacturing of high basis weight plies (above 150 lbs. per 3000 ft$^2$) is much more difficult (in fact, impossible with some types of wet forming papermaking machines) than moderate basis weights below 100 lbs. per 3000 ft$^2$. Second, multiple plies provide a fail safe feature: a pinhole or other failure in one ply does not result in a path through which the fluid can bypass the multi-ply filter. Third, multiple plies tend to even out any irregularities in the distribution of additives in a single ply, as well as any irregularities in porosity. The result is more even flowrates across the face of the multi-ply filter, and surprisingly higher flowrates for multi-ply filters even when such filters have higher total basis weight and therefore better removal efficiencies than single-ply filters.

Formulation F in Table 2, compared with formulations D–E and G–I illustrate the relative performance of single-ply and multi-ply filters. Formulation F was a single-ply filter made from unbleached Kraft softwood pulp, with high concentrations of both metal removal additive (Oil-Dri LVM clay) and halogen and organic chemical removal additive (Norit CA1 activated carbon). At a basis weight of 89 lbs. per ream, it exhibited slow filter flowrates (averaging 2.8 minutes per 900 ml.) but only fair lead removal efficiency and poor chlorine removal efficiency despite its slow speed.

In comparison, formulation H, a three-ply filter, used only 2% LVM clay and 5% activated carbon, yet achieved far superior lead and chlorine removal efficiencies (both sufficient to meet NSF standards). Moreover, it did so at almost twice the filtration rate (1.3 minutes per 900 ml. compared to 2.8 minutes per 900 ml.). This is in part due to its higher total basis weight, achieved by using three plies of low basis weight. Formulation I is another three-ply filter that differs from formulation H primarily in having much higher levels of both LVM clay and activated carbon in the furnish. Based on Formulation I, we discovered that such higher levels improve halogen removal for larger volumes of filtrate.

Comparing formulation F and formulation E, it can be seen that a three-ply filter (formulation E) made from the same unbleached Kraft softwood pulp as Formulation F achieved removal efficiencies close to those of the single-ply formulation F, at a higher filtration rate, without any metal removal additive or halogen and organic contaminant removal additive at all.

Thus, we have discovered that multi-ply filters are superior to single-ply filters in terms of both contaminant removal efficiencies and filtration rates, in part because higher total basis weights can be achieved at a commercial scale using multiple plies. Multi-ply filters, with such high basis weights, can achieve such results using lower levels of metals removal additive and halogen and organic contaminant removal additive, as well.

For commercial applications we have found it is desirable to fabricate multi-ply filters by mechanically embossing a strip along the edges of the plies together as part of the cutting operation.

EXAMPLE 11

Multi-Ply Filters with Mixed Pulp Bases

Formulations J–L illustrate machine-made multi-ply filters that were fabricated from mixed hardwood/softwood pulp bases. Specifically, the softwood pulp for these filters was "Alabama River" unbleached softwood Kraft pulp. The hardwood pulp was "Burgess" unbleached hardwood Kraft pulp.

Comparison of Formulation J with Formulation F demonstrates our discovery that superior lead and chlorine removal can be obtained from a multi-ply filter using a mixed hardwood/softwood pulp base even when the amount of metal removal additive is reduced by a factor of four and the halogen and organic contaminant removal additive is eliminated altogether. These results were achieved without any sacrifice in speed of filtration.

Formulations K and L demonstrate the currently most preferred embodiment of our invention for drinking water filtration applications. In these formulations, the mixed pulp base is "Alabama Pine" unbleached softwood Kraft and "Burgess" unbleached hardwood Kraft in a proportion of about 90/10. Approximately 4% by weight metal removal additive (Oil-Dri LVM attapulgite clay) and 5% by weight halogen and organic contaminant removal additive (Norit CA1 activated carbon) is added to the furnish. The wet strength agent is a polyamide type and the retention aid is a high molecular weight anionic polymer type. Formulations K and L differ only in that K is a three-ply filter and L is a four-ply filter.

Formulations K and L demonstrate our discovery that extremely high efficiencies of metal and halogen removal from large amounts of contaminated fluids can be attained using the higher basis weights and more even flow characteristics attainable with multiple ply filters made from mixed hardwood/softwood pulp bases with modest amounts of additives, while retaining high filtration rates. As discussed in Examples 6 through 8, such multi-ply arrangements also lend themselves to the addition of flavorings, scents or antibacterial agents, as well as to the use of high-lignin pulps such as CTMP pulp in the top (upstream) ply or plies.

EXAMPLE 12

Removal of Other Cations

Tests on multi-ply filters using Formulations G, J and K of Table 2 were run using the ANSI/NSF 43-1988 test protocol for dissolved copper and iron. The results, shown in Table 3, demonstrate that the filters of our invention are also effective for removal of copper and iron impurities from water. In particular, multi-ply filters of the preferred "K" formulation are especially effective in removing iron, one of the primary contributors to unacceptable taste in drinking water. These results, together with the lead tests described above, indicate broad applicability to dissolved metal cations.

EXAMPLE 13

Single Ply Filters Made With Bleached Hardwood Pulps

Because unbleached pulps may sometimes contain residual chemicals from the pulping process that might contaminate the filtrates for very sensitive applications, the capability of providing operable filters based upon bleached hardwood pulps is desirable. The tests shown in Table 4 illustrate that effective bleached filter media can be made from such pulps by using appropriate additives. The filters shown in Table 4 are handsheets that were produced using the test method described in Example 1, above, and tested under the NSF protocols for chlorine and lead that are cited above. As a comparison of formulations P and Q in Table 4 shows, unbleached hardwood without additives provides superior halogen and metals removal efficiencies at a given basis weight compared to unbleached softwood without additives, although at a lower flowrate.

We also have found that the addition of a metal removal additive and/or a halogen and organic contaminant removal additive enables bleached hardwood pulp filters to approach the performance of filters based on unbleached softwoods. The use of multi-ply arrangements and higher basis weights would further improve these performance figures.

EXAMPLE 14

Multi-Ply Filters Using Dissimilar Filter Media

The filters described in Examples 6 through 8, above, comprise multi-ply filters in which the properties of each ply are different. Other such combinations of plies with dissimilar properties are also possible. For example, it may be desirable to provide a multi-ply filter in which the top (upstream) ply contains only a metal removal additive and the bottom (downstream) ply contains only a halogen and organic carbon removal additive, or vice versa. Such arrangements may provide economies in manufacturing and may also enable the assembly of custom filter arrays for various types of contaminants at the point of use instead of during manufacturing. A flavored ply, for instance, could be supplied separately and added to other contaminant removal plies in a holder by the end user. Or, a series of plies of varying densities and/or additive contents could be combined to yield a range of desired purification levels. Many other combinations are also possible.

EXAMPLE 15

Emergency Single-Use Filter Sheets

In another embodiment of our invention, a roll of filter medium (which may be either single or multi-ply; with or without additives) with tear-off perforations at appropriate intervals and sized to fit into an ordinary plastic funnel is supplied. The user simply tears off a piece of filter sheet, folds it to fit the funnel, uses it to filter drinking water and then discards it. This very low cost embodiment of our invention is especially suited for use in emergency situations, such as aid following natural disasters where victims may have to utilize water supplies of questionable purity. The antibacterial filters, and the combination of our filters with soluble antibacterial water treatment agents, is particularly appropriate for this application.

It will be apparent to those of ordinary skill in the art that many changes and modifications could be made while remaining within the scope of our invention. For example, the filters of our invention may be applied to any flowable fluid and are not limited to use with water and air. And, it will be apparent to those skilled in the art that a variety of filter shapes, such as cones, cups and the like, could be utilized in connection with our invention. It is our intention to cover all such equivalent compositions and processing methods, and to limit our invention only as specifically delineated in the following claims.

We claim:

1. A paper filter ply comprising a porous sheet made of unbleached Kraft pulp suitable for removing dissolved metal cations, said paper filter ply having a Kappa number of between about 10 and about 50, said paper filter ply also having a pore size distribution of between about 0.5 microns and about 50 microns and a Canadian Standard Freeness of at least about 400 ml.

2. The paper filter ply of claim 1 having a net electronegative characteristic permitting removal of dissolved metal cations from drinking water.

3. The filter ply of claim 1, further comprising a flavoring agent.

4. The filter ply of claim 1, wherein said filter ply is formed into a roll with periodic perforations, allowing individual filters to be torn off for single-use applications.

* * * * *